(12) United States Patent
Matsumoto et al.

(10) Patent No.: US 8,287,264 B2
(45) Date of Patent: Oct. 16, 2012

(54) INJECTION MOLDING MACHINE

(75) Inventors: Akihiko Matsumoto, Toyokawa (JP);
Yoshihiro Okumura, Tyohashi (JP);
Shinichiro Hara, Kobe (JP); Kanji Sekihara, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/528,839

(22) Filed: Sep. 26, 2006

(65) Prior Publication Data

US 2007/0077327 A1    Apr. 5, 2007

(30) Foreign Application Priority Data

Sep. 28, 2005 (JP) ................................. 2005-283045

(51) Int. Cl.
*B29C 45/78* (2006.01)

(52) U.S. Cl. ........ 425/143; 425/170; 425/549; 425/550; 264/40.6; 264/328.15

(58) Field of Classification Search .................. 425/144, 425/170, 135, 143, 150, 542, 548–550, DIG. 245, 425/543, 547, 145; 264/40.1, 40.6, 328.14, 264/328.15; 164/150.1, 151.4, 155.6, 154.6, 164/151.3; 73/35.16, 766, 774, 777
See application file for complete search history.

(56) References Cited

U.S. PATENT DOCUMENTS

| | | | | |
|---|---|---|---|---|
| 2,296,295 A | * | 9/1942 | Shaw | 264/328.4 |
| 3,492,700 A | * | 2/1970 | Kornmayer | 425/145 |
| 3,733,059 A | * | 5/1973 | Pettit | 366/79 |
| 3,789,103 A | * | 1/1974 | Sueyoshi et al. | 264/328.2 |
| 3,822,867 A | * | 7/1974 | Evans | 366/79 |
| 4,370,115 A | * | 1/1983 | Miura | 425/144 |

(Continued)

FOREIGN PATENT DOCUMENTS

FR    2342009    * 2/1977

(Continued)

OTHER PUBLICATIONS

Platt et al., General Uses and Methods of Thermistors in temperature investigation, with special reference to a technique for high sensitivity contact temperature measurement; Mar. 16, 1950; Department of Botany of the University of Pennsylvania; pp. 507-512.*

(Continued)

*Primary Examiner* — Dimple Bodawala
(74) *Attorney, Agent, or Firm* — Brinks Hofer Gilson & Lione

(57) ABSTRACT

An injection molding comprises: a fixed mold; a movable mold which is capable of contacting to and separating from the fixed mold; and an injection unit which supplies molten resin to a space formed between the fixed mold and the movable mold when being pressed to a non-molding face of the fixed mold. The injection unit comprises: a nozzle portion which injects molten resin to the space formed between the molds; an injecting portion which applies molten resin pressure toward the space formed between the fixed mold and the movable mold though the nozzle portion; a heater and a temperature sensor provided on the nozzle portion; and a heater and a temperature sensor provided on the injecting portion, and detection accuracy of the sensor of the nozzle portion is higher than that of the injecting potion. There is thus provided an injection molding machine capable of manufacturing optics with high accuracy without considerable cost-up by realizing stable and highly accurate injection.

15 Claims, 3 Drawing Sheets

U.S. PATENT DOCUMENTS

| | | | | |
|---|---|---|---|---|
| 4,411,609 A | * | 10/1983 | Yoshii et al. | 425/149 |
| 4,875,845 A | * | 10/1989 | Hara et al. | 425/143 |
| 5,051,086 A | * | 9/1991 | Gellert | 425/549 |
| 5,362,222 A | * | 11/1994 | Faig et al. | 425/145 |
| 5,456,870 A | * | 10/1995 | Bulgrin | 264/40.6 |
| 5,525,050 A | * | 6/1996 | Takizawa et al. | 425/143 |
| 5,551,857 A | * | 9/1996 | Fujioka et al. | 425/143 |
| 5,741,449 A | * | 4/1998 | Yamamura et al. | 264/40.6 |
| 5,762,839 A | * | 6/1998 | Kamiguchi et al. | 264/40.6 |
| 5,776,513 A | * | 7/1998 | Honjo et al. | 425/143 |
| 5,955,120 A | * | 9/1999 | Deissler | 425/547 |
| 6,022,210 A | * | 2/2000 | Gunther | 425/549 |
| 6,328,551 B1 | * | 12/2001 | Takatsugi et al. | 425/145 |
| 6,562,262 B2 | * | 5/2003 | Kamiguchi et al. | 264/40.1 |
| 6,649,095 B2 | * | 11/2003 | Buja | 264/40.6 |
| 7,071,449 B2 | * | 7/2006 | Godwin et al. | 219/426 |
| 7,653,460 B2 | * | 1/2010 | Manda et al. | 700/299 |
| 2006/0024403 A1 | * | 2/2006 | Matsumoto et al. | 425/808 |
| 2006/0138690 A1 | * | 6/2006 | Schwaiger et al. | 264/40.6 |
| 2007/0001332 A1 | * | 1/2007 | Lau et al. | 264/40.6 |
| 2009/0278274 A1 | * | 11/2009 | Bader | 264/40.6 |

FOREIGN PATENT DOCUMENTS

| | | | | |
|---|---|---|---|---|
| JP | 59143626 A | * | 8/1984 | |
| JP | 61106217 A | * | 5/1986 | |
| JP | 63003926 A | * | 1/1988 | |
| JP | 01160628 A | * | 6/1989 | |
| JP | 03211028 A | * | 9/1991 | |
| JP | 04094914 A | * | 3/1992 | |
| JP | 04368831 A | * | 12/1992 | |
| JP | 06055600 A | * | 3/1994 | |
| JP | 06079764 A | * | 3/1994 | |
| JP | 07-308948 A | | 11/1995 | |
| JP | 09262886 A | * | 10/1997 | |
| JP | 10-272654 A | | 10/1998 | |
| JP | 10-323872 | | 12/1998 | |
| JP | 2000006221 A | * | 1/2000 | |
| JP | 2001-079653 A | | 3/2001 | |
| JP | 2002-059458 A | | 2/2002 | |
| JP | 2002-347095 A | | 12/2002 | |
| JP | 2003-165142 A | | 6/2003 | |
| JP | 2004-322362 A | | 11/2004 | |
| JP | 2005-007629 | | 1/2005 | |
| WO | WO 2005032797 A1 | * | 4/2005 | |

OTHER PUBLICATIONS

High accuracy temperature measurement, VTI Instruments, pp. 1-5.*
Machine transaltion of JP 01-160628, pp. 1-15.*
Japanese Office Action Dated Jun. 21, 2011 for Japanese Patent Application No. 2007-537579 with Translation.
Office Action dated Oct. 11, 2011 regarding corresponding Japanese Patent Application No. 2007-537579, 3 pages with English translation.
Office Action dated Nov. 27, 2009 regarding corresponding Chinese Patent Application No. 2006-10141377.4, 6 pages with English translation.
Office Action dated Dec. 1, 2011 regarding corresponding Chinese Patent Application No. 2006-10141377.4, 12 pages with English translation.
Office Action dated Jan. 17, 2012 regarding corresponding Japanese Patent Application No. 2007-537579 (2 pages) with English translation.
Office Action dated Apr. 23, 2012 regarding corresponding Chinese Patent Application No. 2006-10141377.4 (5 pages) with English translation.

* cited by examiner ive items. As described, the conventional injection molding machine has plural temperature control means at respective zones and if all of them are replaced with highly accurate temperature sensors, the replacement accompanies considerable cost-up.

INJECTION MOLDING MACHINE

CROSS-REFERENCE TO RELATED APPLICATIONS

This application is based upon and claims the benefit of priority from the prior Japanese Patent Application No. 2005-283045 filed on Sep. 28, 2005, the entire contents of which are incorporated herein by reference.

BACKGROUND OF THE INVENTION

1. Field of the Invention

The present invention relates to an injection molding machine for molding an optical element with a mold. More particularly, it relates to an injection molding machine which controls temperature with high accuracy to improve molding accuracy.

2. Description of the Related Art

There have conventionally been manufactured various molded items by injection molding. For example, JP Unexamined Patent Publication No. 10-323872 discloses an injection molding machine for molding disks utilized as information recording media. FIG. 4 shows schematic structure of the molding injection machine directed to the Publication No. 10-323872. The molding injection machine includes a fixed platen 101 and a cylinder 103. Four tie-bars 104 are laid between the fixed platen 101 and the cylinder 103 to link them. The tie-bars 104 are supporting a movable platen 105 which is slidable. The movable platen 105 is driven by the cylinder 103. A fixed mold 107 and a movable mold 108 are attached to the fixed platen 101 and the movable platen 105, respectively. The movable mold 108 is clamped to the fixed mold 107 by the cylinder 103. With this state, resin material is supplied from an injection unit 111 to mold a disk.

Such an injection unit of an injection molding machine is required to control temperature with high accuracy so as to carry out stable mold injection with high accuracy. If temperature is too low, molding accuracy deteriorates. If temperature is too high, resin deteriorates or gets stringiness. Therefore, there has conventionally been provided heat adjusting means for a nozzle portion and a cylinder portion. For example, JP Unexamined Patent Publication No. 2005-7629 discloses an injection unit equipped with a heater and a temperature sensor at each zone. In the Publication No. 2005-7629, a thermo couple is disclosed as an example of temperature sensor. Since a thermo couple was cheap and satisfied sufficient accuracy in comparison with conventional accuracy demand, it was used widely.

However, with the advance of accuracy of optical elements, temperature control accuracy managed by the conventional injection molding machine has become insufficient. Especially, as to micro molding machine, its one-shot volume is small and its nozzle portion sometimes has volume of several shots. As one-shot volume is smaller, higher accuracy in proportion to the smallness is required for injection performance and temperature control accuracy. In the case the conventional injection molding machine intends to control temperature with high accuracy, it is required to use a temperature sensor of higher accuracy. As an example of a temperature sensor of which accuracy is higher than a thermo couple, a platinum temperature-sensing element, a quartz temperature sensor, and the like can be utilized. However, they are expensive items. As described, the conventional injection molding machine has plural temperature control means at respective zones and if all of them are replaced with highly accurate temperature sensors, the replacement accompanies considerable cost-up.

SUMMARY OF THE INVENTION

The present invention has been attempted to solve the above-noted problems involved in the conventional injection molding machine. Thus, an object of the invention is to provide an injection molding machine capable of manufacturing an optical element with high accuracy without considerable cost-up by realizing stable and highly accurate injection.

According to a first aspect of the present invention, there is provided an injection molding machine comprising: a fixed mold; a movable mold which is capable of contacting to and separating from the fixed mold; and an injection unit which supplies molten resin to a space formed between the fixed mold and the movable mold when being pressed to a non-molding face of the fixed mold, wherein the injection unit comprises: a nozzle portion which injects molten resin to the space formed between the fixed mold and the movable mold; an injecting portion which applies molten resin pressure toward the space formed between the fixed mold and the movable mold through the nozzle portion; a first heater and a first temperature sensor which are provided at a tip side within the nozzle portion; a second heater and a second temperature sensor which are provided at a side near to the injecting portion within the nozzle portion; and a third heater and a third temperature sensor which are provided within the injecting portion, and wherein a target temperature of the first heater is lower than a target temperature of the second heater, and the target temperature of the second heater is higher than a target temperature of the third heater.

According to the injection molding machine directed to the first aspect of the present invention, the movable mold is made to get contact with the fixed mold and an optical element is mold by injecting resin to a space formed between the molds in contact with each other. Different target temperatures are set for respective portions appropriately, whereby stringing of resin is avoided. Furthermore, stable molding is carried out with high accuracy.

According to a second aspect of the present invention, there is provided an injection molding machine comprising: a fixed mold; a movable mold which is capable of contacting to and separating from the fixed mold; and an injection unit which supplies molten resin to a space formed between the fixed mold and the movable mold when being pressed to a non-molding face of the fixed mold, wherein the injection unit comprises: a nozzle portion which injects molten resin to the space formed between the fixed mold and the movable mold; an injecting portion which applies molten resin pressure toward the space formed between the fixed mold and the movable mold though the nozzle portion; a nozzle heater and a nozzle temperature sensor provided within the nozzle portion; and an injecting portion heater and an injecting portion temperature sensor provided within the injecting portion, and wherein detection accuracy of the nozzle temperature sensor is higher than detection accuracy of the injecting potion temperature sensor.

According to the injection molding machine directed to the second aspect of the present invention, since a highly accurate temperature sensor is employed for the nozzle portion only, it does not accompany considerable cost-up. Furthermore, since temperature at the nozzle portion in which about-to-be-injected resin is collected is controlled with high accuracy, stable injection molding can be carried out with high accuracy. Therefore, an optical element is manufactured with high accuracy.

According to a third aspect of the present invention, there is provided an injection molding machine comprising: a fixed mold; a movable mold which is capable of contacting to and separating from the fixed mold; and an injection unit which supplies molten resin to a space formed between the fixed mold and the movable mold when being pressed to a non-molding face of the fixed mold, wherein the injection unit comprises: a nozzle portion which injects molten resin to the space formed between the fixed mold and the movable mold; an injecting portion which applies molten resin pressure toward the space formed between the fixed mold and the movable mold through the nozzle portion; a first heater and a first temperature sensor which are provided at a tip side within the nozzle portion; a second heater and a second temperature sensor which are provided at a side near to the injecting portion within the nozzle portion; and a third heater and a third temperature sensor which are provided within the injecting portion, and wherein a target temperature of the second heater is higher than a target temperature of the third heater.

According to a fourth aspect of the present invention, there is provided an injection molding machine comprising: a fixed mold; a movable mold which is capable of contacting to and separating from the fixed mold; and an injection unit which supplies molten resin to a space formed between the fixed mold and the movable mold when being pressed to a non-molding face of the fixed mold, wherein the injection unit comprises: a nozzle portion which injects molten resin to the space formed between the fixed mold and the movable mold; an injecting portion which applies molten resin pressure toward the space formed between the fixed mold and the movable mold through the nozzle portion; a first heater and a first temperature sensor which are provided at a tip side within the nozzle portion; a second heater and a second temperature sensor which are provided at a side near to the injecting portion within the nozzle portion; and a third heater and a third temperature sensor which are provided within the injection molding portion, and wherein a target temperature of the first heater is lower than a target temperature of the second heater.

According to the inventive injection molding machine, an optical element is manufactured with high accuracy without considerable cost-up by realizing stable and highly accurate injection.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENT

Preferred embodiments of the present invention will be described in detail below with reference to the accompanying drawings. In this embodiment, the present invention is applied to a lens molding device for manufacturing a plurality of lenses of a camera to be installed in a portable terminal at once. The lens molding device of the present embodiment is to mold a small optical element of which outside diameter is 12 nm or smaller, and an optical element to be mold is required to keep accuracy such as Ra 20 nm or smaller surface roughness of its optical surface. The present embodiment is applied to micro injection molding devices of which clamping force is 150 kN or lower.

Figure 1:
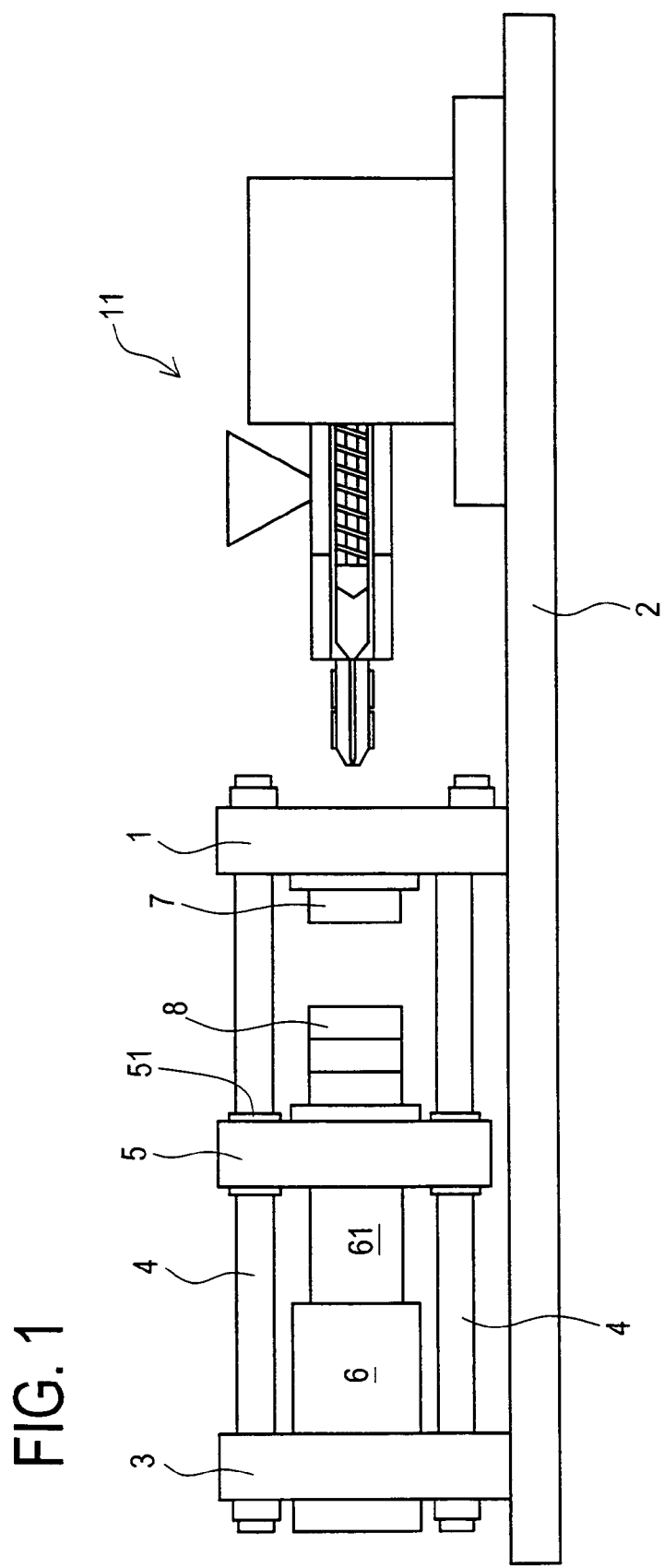
FIG. 1 is a front view showing schematic structure of a lens molding device directed to an embodiment.

The lens molding device of the present embodiment is such structured as shown in FIG. 1. That is, a fixed platen 1 and a rear platen 3 are fixedly provided on a frame 2. Those platens 1 and 3 are substantially square shaped when looked from the left or right side with reference to FIG. 1. Four tie-bars 4 are laid between the fixed platen 1 and the rear platen 3 to link them. The tie-bars 4 are arranged at respective four corners of the fixed platen 1 and the rear platen 3 fixedly. They are arranged in parallel to one another.

A movable platen 5 is provided between the fixed platen 1 and the rear platen 3. The movable platen 5 is substantially square shaped when looked from the left or right side with reference to FIG. 1. Each tie-bar 4 penetrates through around each of four corners of the movable platen 5. Guide bushes 51 are provided at respective penetrating portions for the tie-bars 4. The movable platen 5 is slidable to the four tie-bars 4. The movable platen 5 is supported by the tie-bars 4 without getting contact with the frame 2. A hydraulic press 6 is attached to the rear platen 3. The hydraulic press 6 and the movable platen 5 are connected with a tie-rod 61. That is, the movable platen 5 can be moved in left-and-right direction by driving by the hydraulic press 6.

A fixed mold 7 is attached on a face of the fixed platen 1 facing the movable platen 5. A movable mold 8 is attached to a face of the movable platen 5 facing the fixed platen 1. Temperatures of the movable mold 8 and the fixed mold 7 are controlled respectively.

Figure 2:
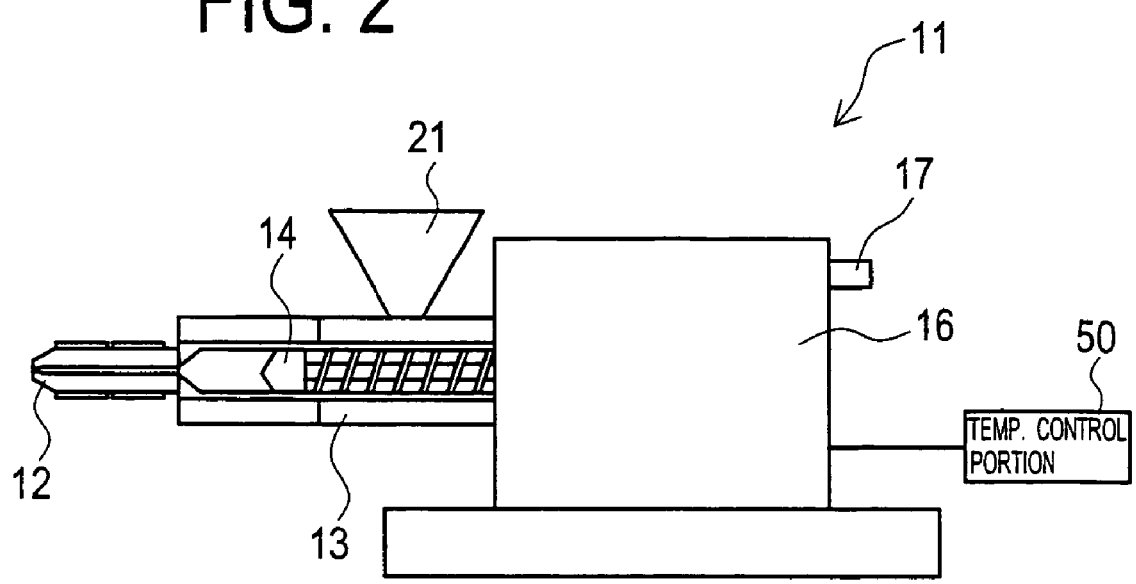
FIG. 2 is a cross sectional view showing schematic structure of an injection unit of the embodiment.

On the frame 2, an injection unit 11 is provided at a rear side of the fixed platen 1 (right side of the fixed platen 1 in FIG. 1). The injection unit 11 has such structure as shown in FIG. 2. The injection unit 11 has a nozzle portion 12, an injection cylinder 13, an injection plunger 14, an injection hydraulic cylinder 16, and a pressure sensor 17, and these elements compose an injection mechanism portion. At the upper part of the injection mechanism portion, there is provided plasticizing mechanism 21 which plasticizes resin and supplies plasticized resin to the injection cylinder 13.

At some parts of the injection unit 11, there are some heaters for plasticizing resin and keeping resin in preferable plasticized condition. Furthermore, a temperature sensor is attached near each heater to detect a temperature around there. There is also provided a temperature control portion 50 which controls respective heaters upon receipt of detection results from respective temperature sensors. Thereby, temperatures at respective portions are controlled to keep at their respective optimum ones. For example, different target temperatures as respective optimum temperatures are set for the plasticizing cylinder 21, the injection cylinder 13, and the nozzle portion 12 and they are controlled to approximate to their respective target temperatures.

Figure 3:
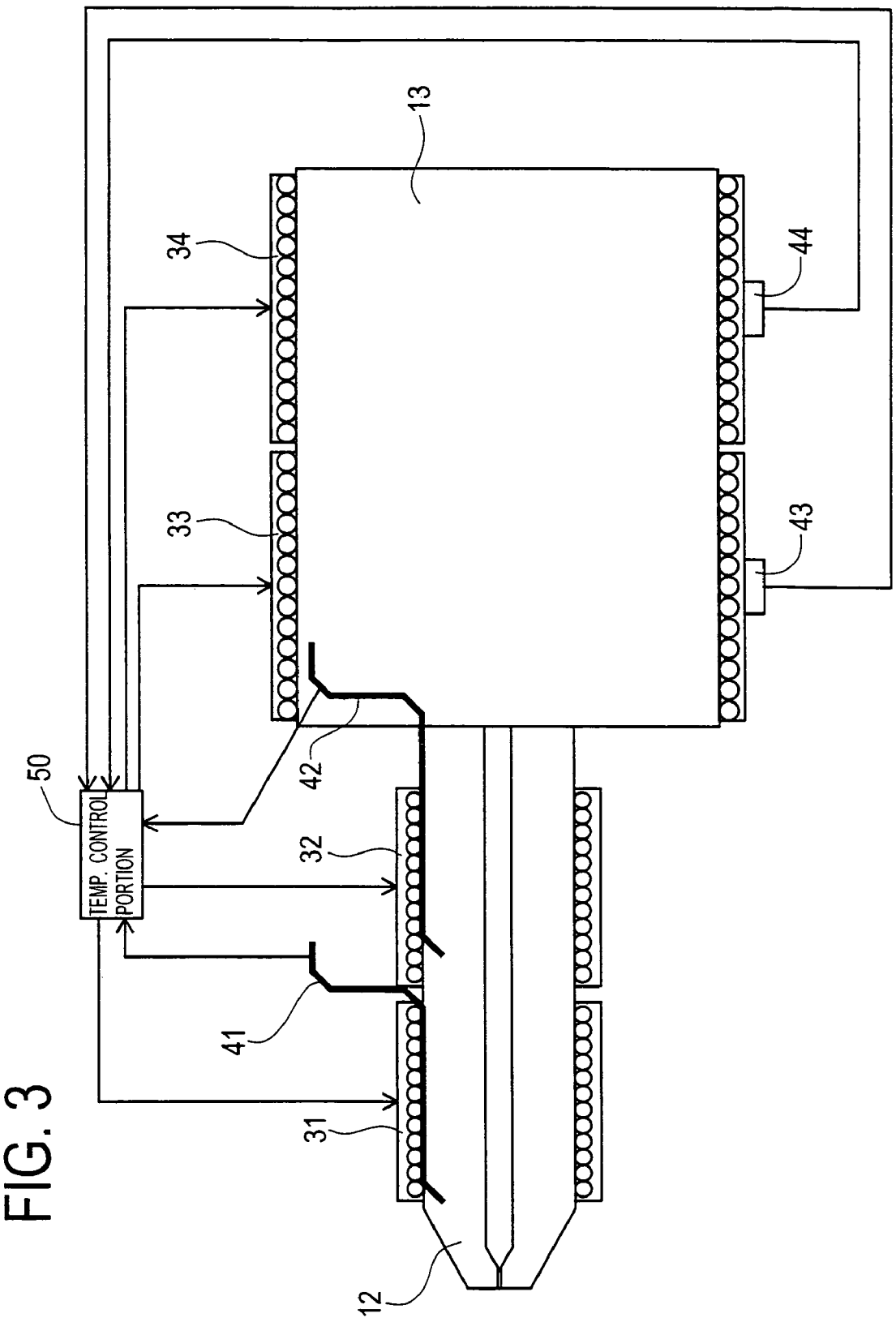
FIG. 3 is a cross sectional view showing schematic structure of a nozzle portion of the injection unit.

In this embodiment, as shown in FIG. 3, heaters 31 and 32 are arranged on the nozzle portions 12, and so are heaters 33 and 34 on the injection cylinder 13. The temperature sensors 41, 42, 43 and 44 are attached near the heaters 31, 32, 33 and 34, respectively. For these temperature sensors 41, 42, 43 and 44, target temperatures are predetermined respectively. The temperature control portion 50 controls the heaters 31, 32, 33 and 34 to make the temperature of the sensors 41, 42, 43 and 44 approximate to their respective target temperatures. In this embodiment, both the number of heaters and that of temperature sensors to be provided on the injection cylinder 13 are "2", however, they may be more than "2" depending on size and volume of the injection cylinder 13.

Due to demand on quality stability of recent years, mold temperature stability has been required to be one degree or smaller as process variable. On the other hand, measurement accuracy or sensitivity of a conventional temperature measuring device including a thermo couple is ±1.5° C.+0.4%, which is not accurate or sensitive enough. On that account, as further accurate or sensitive temperature sensor, use of a platinum temperature sensing element or a quartz temperature sensor, for example, is required. Measurement accuracy or sensitivity of those sensors including its measuring device are: ±0.05° C. (quartz temperature sensor); and ±0.15° C. (platinum temperature sensing element). On the other hand, in the present invention, it is preferable that detection accuracy or sensitivity of a nozzle temperature sensor arranged within a range of one-shot injection volume from a tip portion of the nozzle is higher than that of the injecting portion temperature sensors arranged off the range.

In this embodiment, with consideration of relation between total volume of the nozzle portion 12 and the injection cylinder 13 and one-shot injection volume, detection accuracy or sensitivity of a temperature sensor is selected based on the following criteria. In case one-shot injection volume can be managed within internal volume of the nozzle portion 12, only the nozzle temperature sensors 41 and 42 arranged on the nozzle portion 12 shall be highly accurate or sensitive temperature sensors, such as the previously mentioned quartz and platinum temperature sensors, and the injecting portion temperature sensors 43 and 44 arranged on the injection cylinder 14 are less sensitive thermo couples which are similar to the conventional ones. In the case one-shot injection volume can be managed with total volume of the nozzle portion 12 and a tip portion of the injection cylinder 13, the nozzle temperature sensors 41 and 42 on the nozzle portion 12 and the injecting portion temperature sensor 43 on the tip portion of the injection cylinder 13 shall be highly accurate or sensitive temperature sensors, such as the previously mentioned quartz and platinum temperature sensors. Note that portions of nozzle temperature sensors 41 and 42 are positioned within nozzle portion 12 as shown in FIG. 3.

In the case one-shot injection volume is further larger, the nozzle temperature sensors 41 and 42 on the nozzle portion 12 and the temperature sensors 43 and 44 on the injection cylinder 13 shall be highly accurate or sensitive temperature sensors. With such arrangement, temperature of at least one-shot of resin portion is adjusted within temperature monitoring accuracy or sensitivity of ±0.2° C. or smaller, preferably, within a range of ±0.05° C., and a target temperature is adjusted within accuracy or sensitivity of ±0.3° C. or smaller, as more preferable temperature accuracy or sensitivity, within a range of ±0.1° C. In the case highly accurate molding is required, it is preferable that temperatures of mold base members and cavity members are controlled by highly accurate or sensitive temperature sensors. Temperatures of portions other than these, e.g., plasticizing mechanism portions, can be controlled with conventional thermo couples satisfactorily.

Furthermore, as for the nozzle portion 12, a target temperature near the heater 31 arranged at the tip side of the nozzle portion 12 and a target temperature near the heater 32 at the side of the injection cylinder 13 are different. That is, a target temperature of the temperature sensor 42 at the side of the injection cylinder 13 is slightly higher than that of the temperature sensor 41 at the tip side. On the other hand, same target temperatures are set for the temperature sensors 43 and 44 on the injection cylinder 13. The target temperature of the injection cylinder 13 is set slightly lower than target temperature near the heater 32 arranged at the side of the injection cylinder 13.

Thus, the temperature control portion 50 controls the temperatures at the tip side and at the injection cylinder 13's side of the nozzle portion 12 to different target temperatures. In the case of molding small optical elements, so is one-shot volume. Accordingly, only resin collected in the nozzle portion 12 can possibly exceed one-shot volume. By varying target temperature part by part in the nozzle portion 12, temperature of an essential amount of resin is controlled appropriately.

In such structured lens molding device of the present embodiment, resin supplied from the external is heated in the plasticizing cylinder 21 and agitated by a plasticizing screw 22. The plasticizing screw 22 is driven by the hydraulic motor 24. Of the plasticized resin, predetermined amount of it is supplied to the internal of the nozzle portion 12 from the injection cylinder 13. In the injection cylinder 13, temperature is adjusted by the heaters 33 and 34. In the nozzle portion 12, temperature is adjusted by the heaters 31 and 32 with high accuracy. After that, the fixed mold 7 and the movable mold 8 are clamped and the injection unit 11 is pressed to the fixed mold 7 with predetermined pressing force. In such a clamped state, the injection plunger 14 is driven by the injection hydraulic cylinder 16 and molten resin is supplied to a cavity formed between the clamped molds from the nozzle portion 12, whereby lenses formed.

Types of resin to be used may be what are disclosed in JP Unexamined Patent Publications No. 2004-144951, No. 2004-144953, and No. 2004-144954, for example. Resins disclosed in the publications generally exhibit high fluidity and therefore, injection molding condition is preferable. On the other hand, provided that the resins are left unused for long time under high temperature, they can possibly get burnt, deteriorate, or turn yellow, which is not preferable. In the present embodiment, of the nozzle portion 12, temperature is kept comparatively high only at the portion at the side of injection cylinder 13 so as to enhance molding condition. Since temperature inside of the injection cylinder 13 is controlled by the heaters 33 and 34, deterioration of resin is avoided.

As described, the nozzle portion 12 of the present embodiment has the heaters 31 and 32 at its tip side and injection cylinder 13's side, respectively, and different target temperatures are set for the respective portions. Furthermore, since the heaters 31 and 32 are controlled by using the highly accurate temperature sensors 41 and 42, difference from their respective target temperatures is significantly small. Thereby, even if only small amount of resin is injected, accuracy to transfer a fine shape with resin is enhanced and highly accurate molding is realized. Furthermore, resin sufficiently which has been heated at the injection cylinder 13 side of the nozzle portion 12 and enhanced its fluidity is slightly cooled down at the tip portion of the nozzle portion 12, thereby stringing of resin is avoided.

As described, according to the lens molding device of the present embodiment, highly accurate temperature control is applied to the nozzle portion 12 only. Since an expensive and highly accurate temperature sensor is just employed at a portion within a range of one-shot injection volume, this does not accompany considerable cost-up. Furthermore, temperature of about-to-be injected resin is controlled with high accuracy. Therefore, optical elements are manufactured with high accuracy by realizing stable and highly accurate injection.

The embodiments were described above merely as illustrative examples, but it is nothing to limit the invention in any way. Therefore, the invention can obviously be improved or modified in various ways without deviating from its essentials. For instance, a pre-plasticizing type is described as an example of the injection unit 11. However, an in-line type injection unit is also applicable. Furthermore, driving means of the movable platen 5 is not restricted to the hydraulic press 6. Hydraulic cylinder system, hydraulic toggle system, electric motor type cylinder system, electric-motor-drive toggle system, whatever, may be applicable. The present invention is also applicable to a frame-support type lens molding device in which load of the movable platen 5 is supported by the frame 2.

What is claimed is:

1. An injection molding machine comprising:
a fixed mold;
a movable mold which is capable of contacting to and separating from the fixed mold; and
an injection unit which supplies molten resin to a space formed between the fixed mold and the movable mold when being pressed to a non-molding face of the fixed mold, wherein the injection unit comprising:
a nozzle portion which injects molten resin to the space formed between the fixed mold and the movable mold;
an injecting portion which applies molten resin pressure toward the space formed between the fixed mold and the movable mold through the nozzle portion, wherein only resin collected in the nozzle portion can possibly exceed a one-shot volume;
a first heater and a first temperature sensor which are provided at a tip side at the nozzle portion;
a second heater and a second temperature sensor which are provided at a side near to the injecting portion at the nozzle portion; and
a third heater and a third temperature sensor which are provided at the injecting portion, and wherein a target temperature of the first heater is lower than a target temperature of the second heater, and the target temperature of the second heater is higher than a target temperature of the third heater;
wherein detection accuracy of the first temperature sensor and the second temperature sensor are higher than detection accuracy of the third temperature sensor, such that the temperature of the one-shot volume of the resin is being adjusted within temperature monitoring accuracy of + or −0.2 degree Celsius or smaller.

2. An injection molding machine comprising:
a fixed mold;
a movable mold which is capable of contacting to and separating from the fixed mold; and
an injection unit which supplies molten resin to a space formed between the fixed mold and the movable mold when being pressed to a non-molding face of the fixed mold, wherein the injection unit comprising:
a nozzle portion which injects molten resin to the space formed between the fixed mold and the movable mold;
an injecting portion which applies molten resin pressure toward the space formed between the fixed mold and the movable mold through the nozzle portion, wherein only resin collected in the nozzle portion can possibly exceed a one-shot volume;
a nozzle heater and a nozzle temperature sensor provided at the nozzle portion, wherein the nozzle temperature sensor is selected from the group consisting of a quartz temperature sensor and a platinum temperature sensor; and
an injecting portion heater and an injecting portion temperature sensor provided at the injecting portion, and wherein the injecting portion temperature sensor comprises a thermocouple;
wherein the nozzle temperature sensor has a structure to measure temperature at a first sensitivity and the injecting portion temperature sensor has a structure to measure temperature at a second sensitivity that is less than the first sensitivity, such that the temperature of the one-shot volume of the resin is being adjusted within temperature monitoring accuracy of + or −0.2 degree Celsius or smaller.

3. An injection molding machine according to claim 2, wherein the nozzle heater comprises:
a first nozzle heater provided at a tip side at the nozzle portion; and
a second nozzle heater provided at a side near to the injecting portion at the nozzle portion, wherein the nozzle temperature sensor comprises:
a first nozzle sensor provided at the tip side at the nozzle portion; and
a second nozzle sensor provided at a side near to the injecting portion at the nozzle portion, and wherein the injection molding machine further comprises a temperature control portion which sets different target temperatures for the first nozzle heater and the second nozzle heater.

4. An injection molding machine according to claim 3, wherein the temperature control portion sets a target temperature of the first nozzle heater lower than a target temperature of the second nozzle heater.

5. An injection molding machine according to claim 3, wherein the temperature control portion sets a target temperature of the second nozzle heater higher than a target temperature of the injection molding portion heater.

6. An injection molding machine according to claim 2, wherein plural optical elements are formed simultaneously.

7. An injection molding machine according to claim 6, wherein the injection molding machine forms optical elements of which outside diameter is 12 mm or smaller and surface roughness is Ra 20 nm or smaller.

8. An injection molding machine according to claim 1, wherein the injection unit is movable so that it can move apart from the non-molding face of the fixed mold.

9. An injection molding machine according to claim 2, wherein the injection unit is movable so that it can move apart from the non-molding face of the fixed mold.

10. An injection molding machine according to claim 1, wherein at least a portion of the first temperature sensor is provided at the tip side within the nozzle portion; and
at least a portion of the second temperature sensor is provided at the side near to the injecting portion within the nozzle portion.

11. An injection molding machine according to claim 10, wherein at least a portion of the third temperature sensor is provided within the injecting portion.

12. An injection molding machine according to claim 1, wherein at least a portion of the third temperature sensor is provided within the injecting portion.

13. An injection molding machine according to claim 2, wherein at least a portion of the nozzle temperature sensor is provided within the nozzle portion.

14. An injection molding machine according to claim 13, wherein at least a portion of the injecting portion temperature sensor is provided within the injecting portion.

15. An injection molding machine according to claim 2, wherein at least a portion of the injecting portion temperature sensor is provided within the injecting portion.

* * * * *